United States Patent [19]

Harrison et al.

[11] 4,225,009
[45] Sep. 30, 1980

[54] INTERNAL AIR RELEASE CONTROL APPARATUS AIR GUN

[75] Inventors: Earnest R. Harrison, Plano; Roy C. Johnston, Richardson, both of Tex.

[73] Assignee: Texas Instruments Incorporated, Dallas, Tex.

[21] Appl. No.: 26,975

[22] Filed: Apr. 4, 1979

[51] Int. Cl.² ............................................. G01V 1/14
[52] U.S. Cl. ................................... 181/120; 181/115
[58] Field of Search ............... 367/144; 181/110, 115, 181/118, 120; 137/625.2, 625.25; 251/282

[56] References Cited

U.S. PATENT DOCUMENTS

| | | | |
|---|---|---|---|
| 3,249,177 | 5/1966 | Chelminski | 181/120 |
| 3,379,273 | 4/1968 | Chelminski | 181/118 |
| 3,653,460 | 4/1972 | Chelminski | 181/120 |
| 3,997,021 | 12/1976 | Chelminski | 367/144 |
| 4,098,369 | 7/1978 | Altschuler et al. | 181/120 |

FOREIGN PATENT DOCUMENTS

| | | | |
|---|---|---|---|
| 2175467 | 10/1973 | France | 181/120 |
| 197707 | 1/1976 | U.S.S.R. | 181/118 |

Primary Examiner—Nelson Moskowitz
Attorney, Agent, or Firm—Thomas G. Devine; Leo N. Heiting; Melvin S. Sharp

[57] ABSTRACT

Disclosed is a seismic source device, known in the industry as an air gun, having shuttle control for allowing a predetermined discharge of compressed air into water for purposes of seismic exploration. The shuttle is controlled by valve means for closing the exhaust ports before all of the compressed air in the firing chamber of the air gun is exhausted. By preventing further discharge of air, with little or no loss in acoustic output, secondary pulses are greatly reduced, thereby enhancing the operation of the entire system. Further by preventing all the air in the firing chamber from being discharged, the system becomes more efficient and more cost effective.

15 Claims, 3 Drawing Figures

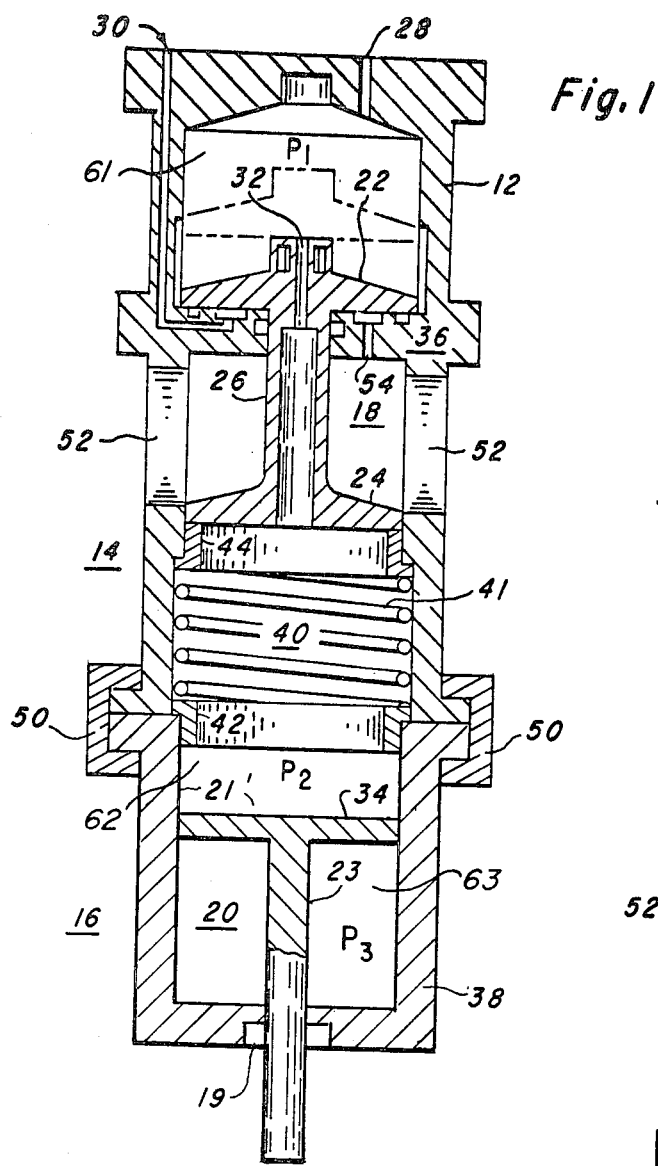
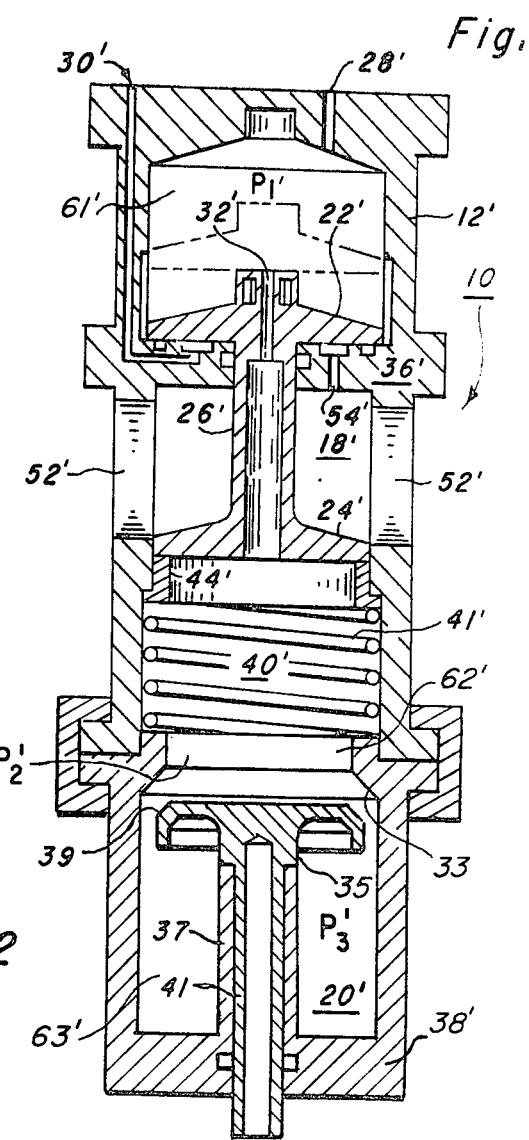
Fig. 1
Fig. 2

INTERNAL AIR RELEASE CONTROL APPARATUS AIR GUN

BACKGROUND OF THE INVENTION

This invention relates to seismic source devices and more particularly to a shuttle controlled seismic source device which allows only a portion of the air found in the firing chamber of the device from being discharged into the surrounding environment.

In marine seismic exploration, a source of acoustic energy is released into the water every few seconds to obtain appropriate acoustic waves that propagate into the earth's surface. These waves are reflected at interfaces of the subsurface formations and propagated back to instruments where transducers convert the acoustic waves to electronic signals which are recorded and later processed into a record section for interpretation of the subsurface formations. Marine seismic exploration is of two types, the first being on water where the seismic source units are strung or towed from a water vehicle. The second type of marine seismic exploration is arctic marine exploration where the seismic source units are disposed below an ice layer to determine the formation of the rock surfaces below the ice layer.

During the past decade, the major marine seismic energy source for both types of marine exploration has been the air gun. An air gun, as in the prior art, releases high-pressure air (typically 2000 PSI up to 6000 PSI or even more) into the water to create the desired acoustic wave.

State of the art air guns normally comprise an annular housing that contains means for discharging compressed air through exhaust ports in the housing. Compressed air is stored within the housing in a firing chamber. The only moving component (except for the solenoid triggering device) in the state of the art air guns is a shuttle, which when raised, permits air to escape from the firing chamber through the exhaust ports in the main housing into the surrounding water. The size of the gun is determined by the firing chamber volume selected. By having a constant source of compressed air through an inlet passage in the housing, the upper chamber containing the shuttle is filled and forces the shuttle into a sealed position closing off all exhaust ports from the firing chamber. By using a solenoid valve to allow air flow underneath the shuttle flange thus forcing the shuttle upward and causing an unequal pressuring on the shuttle pistons opposing each other on the shuttle shaft, the shuttle is accelerated in the upward direction exposing the chamber exhaust ports and allowing compressed air to escape into the surrounding water. When the shuttle is in the down, or closed position, the air gun is charged and ready for firing. When fired, the state of the art gun allows 80-90% of the air in the firing chamber to be exhausted into the water. Consequently, prior art air guns suffer two major disadvantages: first, the efficiency of the air gun for converting stored energy to useful acoustic energy in the seismic passband is well below 10%, and second, the undesirable secondary pressure pulses follow the first acoustic pulse and obscure or confuse the time of the reflected signals.

Several approaches have been taken by the industry to overcome this second disadvantage of undesirable secondary pressure pulses. However, it has been found that the solutions provided are either the cause for a less efficient system of converting stored to acoustic energy or result in greater expense in processing the data. Among the methods presently employed to reduce secondary pulse amplitudes are those that include throttling additional air into the bubble as it forms outside the chamber with a so-called "wave shaping kit", using an array of guns of different sizes, and thus different bubble pulse periods, to destructively reduce the secondary pulses and finally, "signature correction" techniques in data processing to reduce the secondary pulses recorded. "Signature" may be defined as the recorded wavelet or pressure level of the acoustic pressure discharged into the water over a fixed period of time.

Copending United States patent application, Ser. No. 929,883, entitled "Air Release Control in Seismic Energy Source Air Gun", filed July 31, 1978, and assigned to the assignee of this invention, teaches, as a preferred embodiment, an air gun incorporating a secondary shuttle which is activated at the proper moment to cause the closure, by a primary shuttle, or the exhaust ports to further discharge of air from within the air gun.

The present invention utilizes a valve structure, timely activated, whose activation then causes the primary shuttle to reverse its direction, closing off the flow of air, through the exhaust ports, from within the body of the air gun.

SUMMARY OF THE INVENTION

In accordance with the present invention, a seismic source device is provided having a housing with provision for an inner chamber for storing compressed air. A first section of the housing has, as in the prior art, two air inlets for providing compressed air passage to the inner chamber. Further, in the first section of the housing, a shuttle unit is provided for sealing off exhaust ports formed in the housing, thus preventing compressed air from exhausting through these ports. The shuttle found in the first section of the housing is actuated by a solenoid valve element which allows air to force the shuttle in an upward direction, releasing compressed air from the inner chamber.

By placing a means for controlling the shuttle found in the first section of the housing in a second section of the housing, the exhaust ports may be closed relatively soon after the inital discharge, thus preventing complete exhaustion of the inner chamber and making the seismic exploration more cost effective, efficient, and reducing undesirable secondary pulses in the acoustic signal. One possible means for controlling the shuttle is a valve disposed in the second section of the housing. At the instant of maximum discharged pressure level, the valve prevents further discharge of the air found at the greatest pressure in the inner chamber from escaping, and thus allows the compressed air coming in from the air inlets to force the shuttle downward, sealing off the exhaust ports.

BRIEF DESCRIPTION OF THE DRAWINGS

For a more complete understanding of the present invention, reference may now be made to the following description taken in conjunction with the accompanying drawings in which:

FIG. 1 is a complete cross sectional view of a seismic source unit in accordance with the present invention.

FIG. 2 is a complete cross sectional view of another embodiment of a seismic source unit.

DETAILED DESCRIPTION OF THE DRAWINGS

Figure 3:
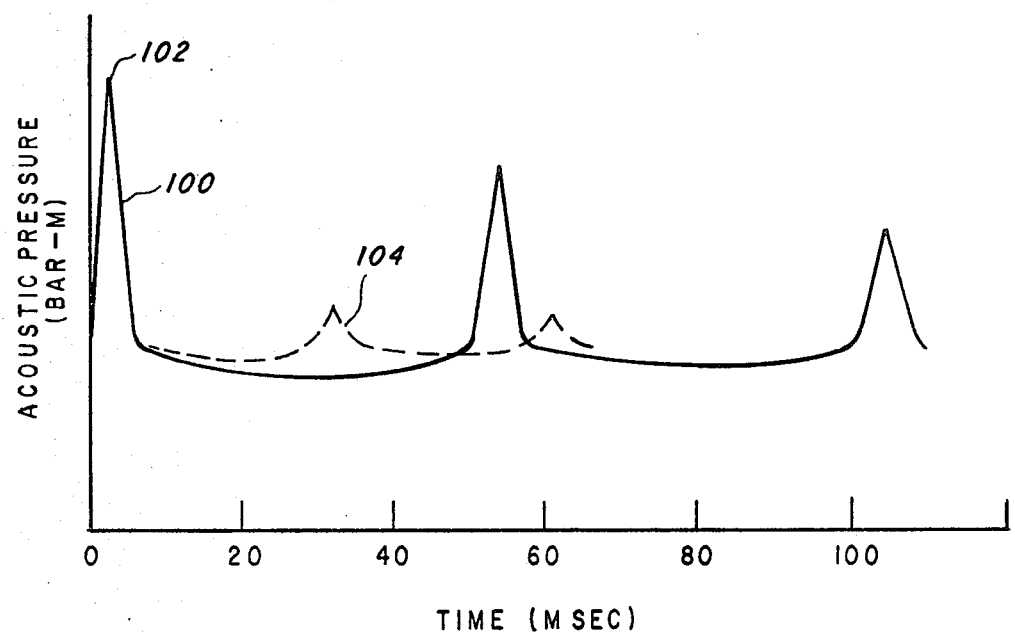
FIG. 3 is a graphical representation of an acoustic pulse signal.

Referring now to the figures and more specifically to FIG. 1, a seismic source unit displaying shuttle control is illustrated. The seismic source unit 10 comprises a housing 12 that may be sectionalized into a first housing 14 and second housing 16. In the prior art, the second housing 16 contained either an empty chamber for storing compressed air or a fixed, divided chamber otherwise known as the firing chamber. The seismic source unit of the present invention, utilizing shuttle control, places a shuttle 18 in a first housing 14, and a valve 20 in a second housing 16. The shuttle 18 has opposing annular pistons 22 and 24 connected by a shaft 26. The valve 20 has valve head 34 connected to valve stem 23. The shuttle 18 and valve 20 are sliding devices within their respective housings 14 and 16.

The first housing 14 containing shuttle 18 provides two air inlet passages 28 and 30. Inlet passage 28 provides compressed air to the inner chamber of housings 14 and 16. Inlet passage 30 is further connected to a solenoid valve, not shown, which actuates the shuttle 18 as described hereinafter.

Shuttle 18 further provides an orifice 32 found in the center of shaft 26. Valve 20 provides a dynamic seal between the edge of valve head 34 and inside wall 21, permitting air to slowly pass so that pressure P2 will equal pressure P3 under static conditions. Alternatively, a port through valve head 34 may be provided. Valve 20 is made as light as possible to follow the air flow during operation of the air gun.

The inner chamber of the seismic air unit 10 may be divided into a plurality of air chambers such as those found in FIG. 1 labeled 61, 62 and 63. The sliding shuttle 18 is disposed within chamber 14 such that the annular piston 22 is capable of seating against cross member structure 36. Valve stem 23 passes through seal 19 found in the second sectional housing 16, in lower member 38 and also through sleeve 37 which is attached to lower member 38 at one end and against which valve head 34 bears at the other end when the air gun is charged. Shuttle 18 has its shaft 26 sliding through a cutout in cross member 36.

To effectively seat the annular piston 24 and valve head 34 when their movement is not restricted by a pressurized air cushion, a resilient seating capability 40 is necessary. Such a capability is made possible by utilizing elastic means which may be in the form of a spring element 41 in combination with annular support members 42 and 44. Air cushioning may also be provided for valve 20 by contour 65 in valve head 34 which is shaped to receive cushion member 66 positioned below annular member 42.

Since the volumetric size of the chamber determines the size or firing power of the seismic source unit, variable housing sizes may be used for the second housing 16. Providing clamps 50 to hold the first and second housings 14 and 16 together allows for the use of a variable size firing chamber or second housing 16. Also, to effectively discharge an acoustic signal into the water as a result of forcing air out of the seismic source unit 10, a plurality of discharge or exhaust ports 52 are provided.

In describing the operation of the seismic source unit 10 found in FIG. 1, it is necessary to refer to both FIGS. 1 and 3, with FIG. 3 illustrating an acoustic pulse signal as a function of time. In the prior art, upon the firing of a seismic source unit, a shuttle similar to the shuttle 18 illustrated in FIG. 1 is forced by use of an actuating means, such as a solenoid element, to force the shuttle upward, thereby moving piston 24 away from annular support member 44, releasing the compressed air found in the lower firing chamber. This action results in an acoustic pulse signal similar to the signal found in FIG. 3 represented by the solid line 100. As can be seen from the graph, the peak output pressure level 102 is reached in a very short time, e.g., 1.3 m sec, for a chamber 62 size of 40 cu. in. at pressure P2 of 2000 psi and continuing the firing cycle, i.e., keeping the shuttle in the upward position and allowing further air to escape, results in wasted energy and further causes unwanted oscillating bubbles in the water media which result in secondary acoustic pressure pulses which generally distract from the primary pressure pulse for recording purposes.

In accordance with the present invention utilizing shuttle control, the unit reduces the firing cycle by effectively closing off the exhaust ports before all the compressed air is discharged from the firing chamber and saves compressed air, i.e., energy, and further reduces secondary pulses thereby enhancing the value of the recorded primary acoustic pulse. A representation of such an acoustic signal from the present invention is the dotted line 104 in FIG. 3. Here the secondary pulses are reduced and do not interfere with the primary pulse.

Operationally, the seismic unit 10 is provided with compressed air from the source of supply through air inlet 28. This compressed air fills chamber 61 prior to filling chambers 62 and 63. As the pressure rises in chamber 61, air is further forced into chamber 62 through orifice 32, and into chamber 63 through the dynamic seal formed between the edge of valve head 34 and wall 21. This provides air into chamber 63. Upon being fully charged, and in equilibrium, pressures P1-P3 are equal.

As compressed air is forced through inlet 28 prior to reaching this equilibrium condition, the shuttle 18 is forced into a downward position where its annular piston 22 seats onto crossmember 36, further sealing its annular piston 24 onto angular member 44. Following the path of the compressed air as it flows through chamber P2, valve 20 will also be forced into a downward position because the force exerted against the top surface of valve head 34 is greater than that exerted against the bottom surface. This condition exists simply because the air pressure is the same against both surfaces, but the bottom surface has a smaller area because of the presence of valve stem 23. Force equals pressure times area, hence a lower force on the bottom surface exists. While the seismic source unit 10 is in the equilibrium condition or firing position, the discharge ports 52 are blocked from the compressed air in chambers 62 and 63 by the shuttle 18, thus preventing any compressed air from being discharged into the surrounding water.

To fire the seismic source unit, i.e., discharge or exhaust compressed air into the surrounding water, it is necessary to actuate the shuttle 18. This may be accomplished by use of a solenoid valve, not shown in FIG. 1, whereby compressed air is forced under annular piston 22 through inlet 30, thus releasing the shuttle 18's seating forces and explosively accelerating it upward as shown by the dashed line in the figure. Air from the solenoid air inlet is exhausted to the outside media through orifice 54. This motion permits compressed air to be released from discharge ports 52, thus decreasing the pressure in chamber 62 and causing the pressure in chamber 63 to accelerate valve 20 upwardly, cushioned by air compressed between contour 65 and cushion member 66, to ultimately seat against annular member 42. The impact is also absorbed by spring element 41. However, after valve 20 has seated against annular member 42, thereby sealing chamber 63 from further exhaustion of compressed air, no further air is discharged from chamber 63 through discharge ports 52. This termination of air being discharged upon firing is caused by the sudden reseating of the shuttle 18 onto annular member 44. This reseating or downward shuttle motion is due to the sudden drop in pressure P2 which becomes less than the supply pressure P1, thus forcing the shuttle 18 into a downward slide. Once the shuttle 18 is seated on annular member 44, the valve 20 is forced downward as the pressure P2 increases until such time as the valve is forced into its most downward position, completing the firing sequence and recharging the seismic air unit 10.

Referring now to FIG. 2, an alternative embodiment of a seismic air gun 10' is shown. It should be noted that air gun 10' is generally identical to air gun 10 of FIG. 1 with similar parts being identified using the same identifying number, differentiated by a ' notation. In general terms, the differences exist in the lower portion of the air gun where it can be seen that in air gun 10' of FIG. 2 there is no annular support member 42 and the valve 20' has a hollowed valve stem 41 positioned within valve guide 37'. Also, the valve head 35 is formed so that an angled or beveled edge thereof fits into inside wall 33 of chamber 63'.

After air has been introduced through inlet 28', the pressures in chambers 61', 62' and 63' are equal. The pressure P3' acts to hold valve 20' downwardly against the top of valve guide 37' because the open valve stem 41 encounters ambient hydrostatic pressure on the order of 25 pounds per square inch as compared to the pressure P3 of approximately 2015 pounds per square inch. As described above with respect to the operation of FIG. 1, the shuttle is seated with piston 22' being seated against cross member 36' and piston 24' being seated against annular member 44'.

Air is forced into entry 30', forcing shuttle 18' to move upwardly. Such movement permits air from chamber 62' to exhaust through ports 52'. The air movement around the valve head 35 causes a high velocity flow resulting in a differential pressure P2' less than P3' across it. This differential pressure results in a closing force on valve 35 to suddenly slam the valve 35 closed, seating surface 39 against inside wall 33. This closed condition occurs when the acoustic pressure amplitude in the water is maximum, thus conserving air in the chamber and increasing stored-to-acoustic conversion efficiency. Shuttle 18' remains open until pressure P2 becomes low enough to allow shuttle 18' to seat against angular member 44', closing off the air flow through ports 52'. When piston 24' is seated against angular support member 44', the pressure in chamber 62' rises to the point where it is equal to the pressure in chamber 63' forcing valve 20' downwardly against the valve guide 37 and air gun 10' is again ready to fire.

While the invention has been described and illustrated with respect to a specific embodiment, it is understood that changes or modifications can be made without departing from the spirit and scope of the invention described herein.

What is claimed is:

1. A seismic energy source apparatus having a housing defining at least one exhaust port and an inner chamber for storing compressed air and containing a shuttle having first and second pistons disposed generally parallel to each other at opposite ends of a shaft with an orifice therethrough, having a first air supply means for providing compressed air to the chamber and having a second air supply means controlled by acutating means for supplying air pressure under the first piston to cause the shuttle to move upwardly, comprising:
   (a) seating means disposed within the chamber against which the first piston seats;
   (b) resilient seating means disposed within the chamber against which the second piston seats at one end; and
   (c) a valve positioned within the chamber having a valve head and a valve stem, the head seating against the resilient means at the other end when actuated by the shuttle moving upwardly, and the stem passing through an aperture in the bottom of the housing.

2. The apparatus of claim 1 wherein the seating means comprises a member attached to the walls of the inner chamber having an inlet for receiving the second air supply means and an outlet therethrough for exhausting air from the second air supply means.

3. The apparatus of claim 1 wherein the resilient seating means comprises a compressible spring having a support member bearing against its top surface to form a seat for the second piston, and a support member bearing against its bottom surface to form a seat for the valve head.

4. The apparatus of claim 1 including a valve guide attached to the bottom of the housing extending over the aperture and receiving the valve stem and wherein the edge of the valve head and the wall of the chamber form a dynamic seal, permitting equalization of air pressure during static conditions.

5. The apparatus of claim 2 wherein the resilient seating means comprises a compressible spring having a support member bearing against its top surface to form to a seat for the second piston, and a support member bearing against its bottom surface to form a seat for the valve head.

6. The apparatus of claim 2 including a valve guide attached to the bottom of the housing extending over the aperture and receiving the valve stem and wherein the edge of the valve head and the wall of the chamber form a dynamic seal, permitting equalization of air pressure during static conditions.

7. The apparatus of claim 5 including a valve guide attached to the bottom of the housing extending over the aperture and receiving the valve stem and wherein the edge of the valve head and the wall of the chamber form a dynamic seal, permitting equalization of air pressure during static conditions.

8. The apparatus of claim 3 wherein the valve head has an orifice formed therethrough to permit equalization of pressure during static conditions.

9. A seismic energy source apparatus having a housing defining at least one exhaust port and an inner chamber for storing compressed air and containing a shuttle having first and second pistons disposed generally parallel to each other at opposite ends of a shaft with an orifice therethrough, having a first air supply means for providing compressed air to the chamber and having second air supply means controlled by actuating means for supplying air pressure under the first piston to cause the shuttle to move upwardly, comprising:

(a) first seating means disposed within the chamber against which the first piston seats;

(b) resilient seating means disposed within the chamber against which the second piston seats at one end;

(c) second seating means positioned below the resilient seating means; and (d) a valve positioned in the inner chamber having a valve head and a valve stem, the stem passing through an aperture at the bottom of the housing whereby it is subjected to ambient hydrostatic pressure, the head being formed to seat on the second seating means after the shuttle moves upwardly.

10. The apparatus of claim 9 wherein the first seating means comprises a member attached to the walls of the inner chamber having an inlet for receiving the second air supply means and an outlet therethrough for exhausting air from the second air supply means.

11. The apparatus of claim 9 wherein the resilient seating means comprises a compressable spring having a support member bearing against its top surface to provide a seat for the second piston.

12. The apparatus of claim 9 including a valve guide attached to the bottom of the housing, extending over the aperture into the inner chamber and receiving the valve stem.

13. The apparatus of claim 11 wherein the second seating means comprises a member connected to the walls of the inner chamber having a top surface against which the bottom surface of the spring bears, and a bottom surface against which the valve head bears when the valve moves upwardly.

14. The apparatus of claim 11 wherein the first seating means comprises a member attached to the walls of the inner chamber having an inlet for receiving the second air supply means and an outlet therethrough for exhausting air from the second air supply means.

15. The apparatus of claim 13 wherein the first seating means comprises a member attached to the walls of the inner chamber having an inlet for receiving the second air supply means and an outlet therethrough for exhausting air from the second air supply means.

* * * * *